US009672803B2

(12) United States Patent
Saxman et al.

(10) Patent No.: US 9,672,803 B2
(45) Date of Patent: Jun. 6, 2017

(54) ADAPTIVE ACTIVE NOISE CANCELLATION

(71) Applicant: GM Global Technology Operations LLC, Detroit, MI (US)

(72) Inventors: Brad A. Saxman, Brighton, MI (US); Scott M. Reilly, Southfield, MI (US); Frank C. Valeri, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/491,116

(22) Filed: Sep. 19, 2014

(65) Prior Publication Data

US 2016/0086592 A1 Mar. 24, 2016

(51) Int. Cl.
*G05D 1/00* (2006.01)
*G10K 11/175* (2006.01)
*G10K 11/178* (2006.01)

(52) U.S. Cl.
CPC .......... *G10K 11/175* (2013.01); *G10K 11/178* (2013.01); *G10K 2210/1282* (2013.01); *G10K 2210/3016* (2013.01)

(58) Field of Classification Search
CPC ..................... G10K 11/175; G10K 2210/1282
USPC ............................................................ 701/1
See application file for complete search history.

(56) References Cited

U.S. PATENT DOCUMENTS 5,850,458 A * 12/1998 Tomisawa .......... G10K 11/1786 381/71.4
6,912,286 B1 * 6/2005 Daly .................. G10K 11/1788 381/71.1
8,045,725 B2 * 10/2011 Theobald ............. G10K 11/178 381/71.4
2006/0219459 A1 * 10/2006 Suzuki ................... G08B 21/06 180/273
2007/0050095 A1 * 3/2007 Nelson ................ B60R 16/0231 701/1
2011/0142248 A1 * 6/2011 Sakamoto .......... G10K 11/1784 381/71.4

FOREIGN PATENT DOCUMENTS

EP 0486180 A2 5/1992

* cited by examiner

*Primary Examiner* — Ian Jen
(74) *Attorney, Agent, or Firm* — BrooksGroup

(57) ABSTRACT

A number of variations may include a method including obtaining data indicating a driver intent from a vehicle and using an ANC system to cancel noise in an appropriately reactive manner.

15 Claims, 2 Drawing Sheets

ADAPTIVE ACTIVE NOISE CANCELLATION

TECHNICAL FIELD

The field to which the disclosure generally relates to includes noise cancellation.

BACKGROUND

Vehicles may include an active noise cancellation system. As non-limiting examples, methods of active noise cancellation are disclosed in U.S. Pat. No. 5,850,458 A and EP 0486180 A2, and methods of active noise cancellation in vehicles specifically are disclosed in U.S. Pat. No. 6,912,286 B1, US 2011/0142248 A1 and U.S. Pat. No. 8,045,725 B2.

SUMMARY OF SELECT ILLUSTRATIVE VARIATIONS

A number of variations may include a method including obtaining data indicating a driver intent from a vehicle and using an ANC system to cancel noise in an appropriately reactive manner.

A number of variations include a method, which may include using a control system to detect the rate of change in orientation of the vehicle accelerator pedal and, based upon at least one of the rate of change of the vehicle accelerator pedal, adjusting the reactiveness an active noise cancellation (ANC) system.

A number of illustrative variations may include a method including tracking the use of vehicle controls, using the control system to estimate driver intent from the tracked vehicle control usage and, based upon the estimated driver intent, using an ANC system to cancel vehicle noise in an appropriately reactive manner. As a non-limiting example, a driver may rapidly change the vehicle accelerator pedal or brake pedal positions by quickly depressing such pedals in a spirited driving event, indicating the driver's intent to drive aggressively.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

The presently disclosed methods of Adaptive ANC methods may be carried out using any suitable system and may also be carried out in conjunction with a system such as the system described herein. The following system description simply provides a brief overview of one example adaptive active noise cancellation system, but other systems and components not shown here may also support the presently disclosed methods.

Figure 1:
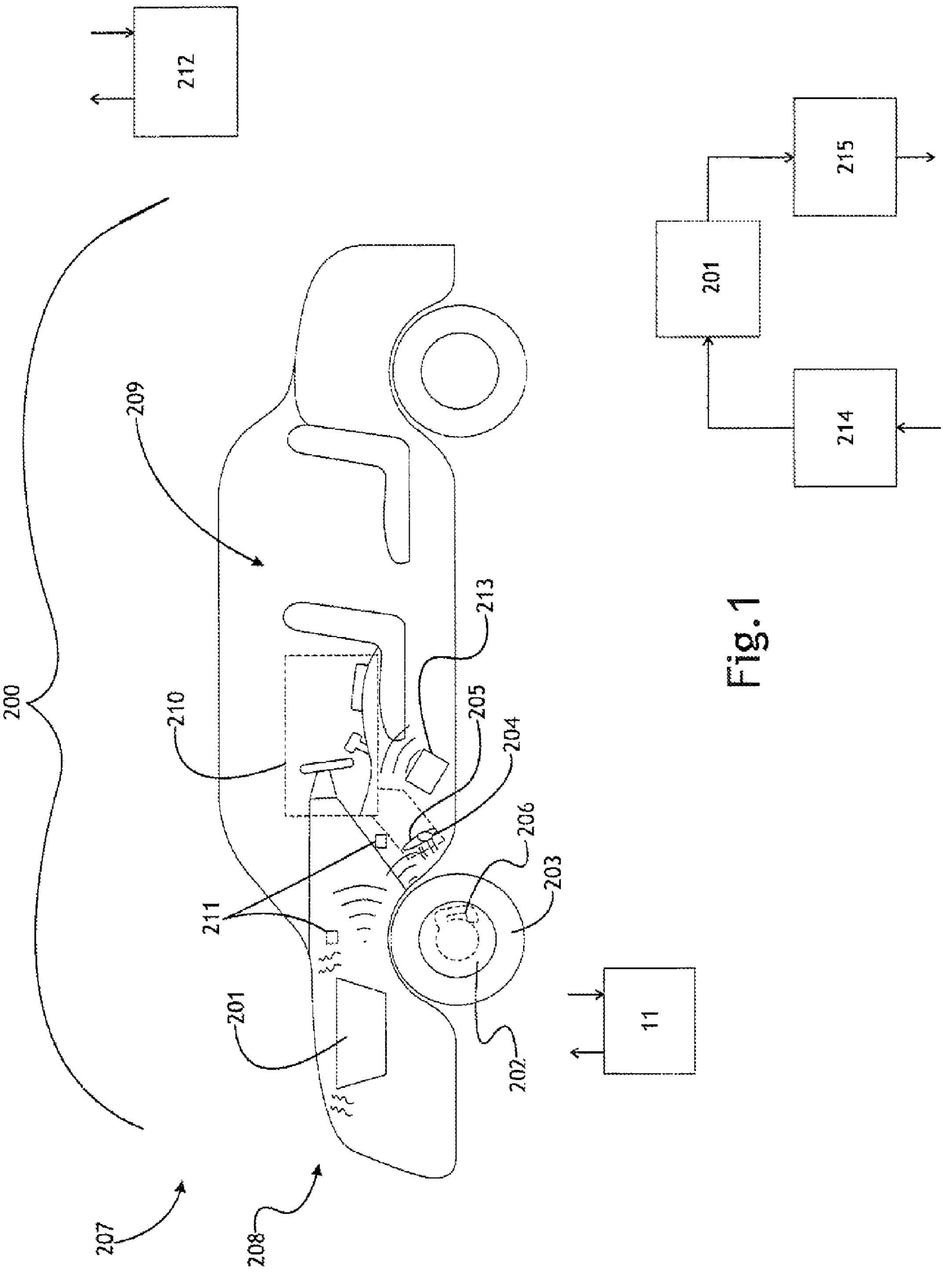
FIG. 1 illustrates a system in which a number of the illustrative variations described may be used.

In a number of illustrative variations, and as illustrated at least in part by FIG. 1, a vehicle 200 may be provided. The vehicle 200 may be equipped with components such as but not limited to an engine 201, wheels 202, tires 203, an acceleration pedal 204, a brake pedal 205, brakes 206, an induction system 214, an exhaust system 215 or any other functional, non-functional or decoration, part, component or sundry which may generate noise at any time. The vehicle 200 may have a vehicle body 207 which may be generally described as having an exterior portion 208 and an interior portion 209. The interior portion 209 of the vehicle body 207 may contain room for a driver and driver controls 210 which may include additional driver input devices such as but not limited to a touchpad interface for inputting driver input data. If the vehicle has an engine, the vehicle engine 201 may be of the combustion type, or any other type known in the art, and the engine may be said to be located on or within the exterior portion of the vehicle body 209. The vehicle may be equipped with any number of sensors 211 which may be capable of detecting one or more conditions such as but not limited to sound, pressure, temperature, acceleration, or magnetism and may be capable of producing at least one of sensor data or sensor signals and may sense and be at least one of polled or read by a control system 212. Additionally, the sensors 211 may be located anywhere in, on, or around the vehicle body 207, and may sense and produce signals based upon events or stimuli such as but not limited to the engagement, orientation, state or condition of any number of vehicle parts, components, decorations, or sundry. The vehicle 200 may be in communication with a control system 212 which may be capable of analyzing data, communicating with the sensors 211, reacting to analyzed data and at least one of sensor data or sensor signals, and responding to analyzed data and at least one of the sensor data or sensor signals.

In a number of illustrative variations, the vehicle 200 may or may not be insulated, and sounds originating from the exterior portion 208 of the vehicle body 207 may emanate into the interior portion 209 of the vehicle body 207. Additionally, sounds originating from the interior portion 209 of the vehicle body 207 may emanate outside the exterior portion of the vehicle body 207. The vehicle may be equipped with any number of ANC systems known in the art and the ANC system may be used to affect sounds within or without the vehicle 200 in manners such as but not limited to actively damping, attenuating or eliminating the sounds.

In a number of illustrative variations, the control system 212 may include one or more controllers (not separately shown) in communication with sensors for receiving and processing sensor input and transmitting output signals. The controller(s) may include one or more suitable processors and memory devices. Any memory devices may be configured to provide storage of data and instructions that provide at least some of the functionality of the engine system and that may be executed by the processor(s).

In a number of illustrative variations, the control system 212 may be capable of processing sequential logic as well as combinational logic and may be housed onboard the vehicle. Additionally, a device capable of reading data from memory and/or external storage devices may be in electrical communication with vehicle components including but not limited to the control system component(s). Any controller included in the control system 212 may have onboard memory and may be in electrical communication with an external data storage device as well as external memory devices. Such controllers may be in electrical communication with any number of sensors, controllers, batteries, renewable energy sources or other electrical devices and may have the ability to store and timestamp data indicative of readings and/or signals from any number of sensors. Additionally, at least one of the sensor signals or readings may be used by the control system 212 in logical operations such as but not limited to sequential logic, conditional logic or combinational logic.

In a number of illustrative variations, at least portions of the methods disclosed herein may be enabled by one or more computer programs and various engine system data or instructions stored in memory as look-up tables, formulas, algorithms, maps, models, or the like. The control system may control ANC system parameters by receiving input signals from the sensors, executing instructions or algorithms in light of, in reaction to, or in response to input signals, and transmitting suitable output signals to the various ANC system components. As used herein, the term "model" may include any construct that aims to represent something using at least one of data or variables, such as a look up table, map, formula, algorithm and/or the like. Models may be application specific and particular to the exact design and performance specifications of any given ANC system.

In a number of illustrative variations, the vehicle 200 may be equipped with one or more sound emitting device 213 such as but not limited to a speaker, whistle or horn, which the control system 212 may also be in communication with. The control system 212 may have the ability of activating and controlling the sound emitting device 213 as part of or in conjunction with the ANC system, in light of, in response to, or in reaction to analyzed data as well as one or more of sensor data or sensor signals.

A number of variations may include a method comprising using a control system and at least one sensor to detect and approximate at least one of a sound or sound pattern to be cancelled and to selectively react to the at least one sound or sound pattern to be cancelled via an ANC system by any number of methods such as but not limited to adjusting the output level of a sound emitting device such as but not limited to a noise cancelling speaker, adjusting the sound played by a sound emitting device, adjusting an activation threshold level for the ANC system, adjusting the rate at which the ANC system works, or generally adjusting any factor which affects any noise cancellation achieved by the ANC system in an instant, continuously, or over a period of time.

A number of variations may include a method comprising using a control system to receive or produce at least one of data representative of the presence of a sound, such as but not limited to pressure data, or a model, such as but not limited to a waveform, and to approximate at least one of a sound or sound pattern to be cancelled from at least one of the data or model. The control system may then be used to selectively respond to the at least the approximated sound or sound pattern to be cancelled via an ANC system by at least one of adjusting the output level of a sound emitting device such as but not limited to a noise cancelling speaker, adjusting an activation threshold level for the ANC system, or adjusting the rate at which the ANC system cancels noise.

A number of variations may include a method of adaptive noise cancellation via the use of an ANC system comprising a control system which is capable of receiving or producing data which may aid in successful noise cancellation via selective use of an ANC system such as but not limited to vehicle speed data, vehicle acceleration data, temperature data, vehicle exhaust system data such as but not limited to exhaust gas pressure or composition, throttle position, or vehicle part, decoration, component or sundry states such as but not limited window position, door position, roof position or presence, or any other data which may affect the acoustic inputs or outputs of the vehicle. In such illustrative variations, the control system may use the data as a factor within an algorithm that determines the degree to which the ANC system is used to cancel noise based at least upon estimated driver intent.

Figure 2:
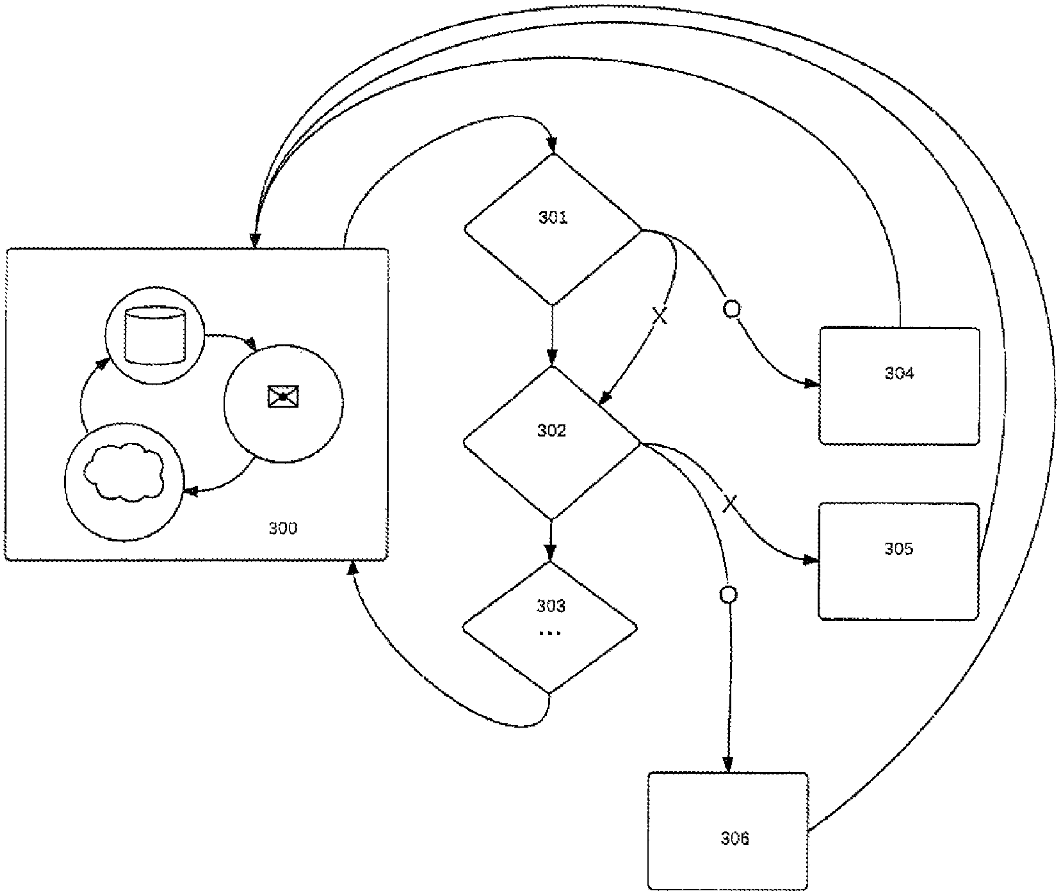
FIG. 2 illustrates a flow chart of an illustrative variation in which traditional ANC and adaptive ANC methods are blended.

In a number of illustrative variations, and as illustrated by FIG. 2, the control system may track general data such as but not limited to vehicle location, vehicle performance data such as but not limited to crankshaft rotations per minute, and driver input such as but not limited to rate of change, or absolute position of the vehicle's acceleration pedal or brake pedal. The control system may then use any of this data in a series of logical steps to determine whether the ANC system should be engaged in a manner known in the art, whether the ANC system should be disengaged, or whether the ANC system should be used in the adaptive method disclosed herein. As a non-limiting example, referring to FIG. 2, in step 300 the control system may be constantly collecting data relevant to the adaptive ANC algorithm, such as but not limited to polling sensors, collecting driver input, or monitoring general data. Prompted by a change in data, or in a spontaneous manner, or any other manner known in the art, the control system may run the relevant data through any number of conditional logic steps, as represented by steps 301 ("Are RPM's Over Threshold?"), 302 ("Was Rate of Pedal Change High?") and 303 (" . . . "), to determine whether to affect the approach of the ANC system by moving to step 304 in which the ANC system is disabled, moving to step 305 in which standard ANC methods are used, or moving to step 306 in which the adaptive ANC method disclosed herein is used. After affecting the approach of the ANC system, the control system may return to focusing solely on tracking relevant data until the ANC system needs to be affected again. Note that in FIG. 2, and this non-limiting example, conditional logic step 303 contains an ellipses to indicate that any number of conditional logic steps may be contained in any number of variations.

For example, in a number of illustrative variations, a driver may wish to participate in a spirited driving event and may therefore wish for the dominant sound of the engine to fill the interior portion of the vehicle body so that he or she and any passengers may hear it. When the driver quickly presses down the acceleration pedal, as a way of adapting to driver intent, the control system may track a high rate of change in the pedal and adaptively ramp off the level of interior noise cancelation performed by the ANC system.

Figure 3:
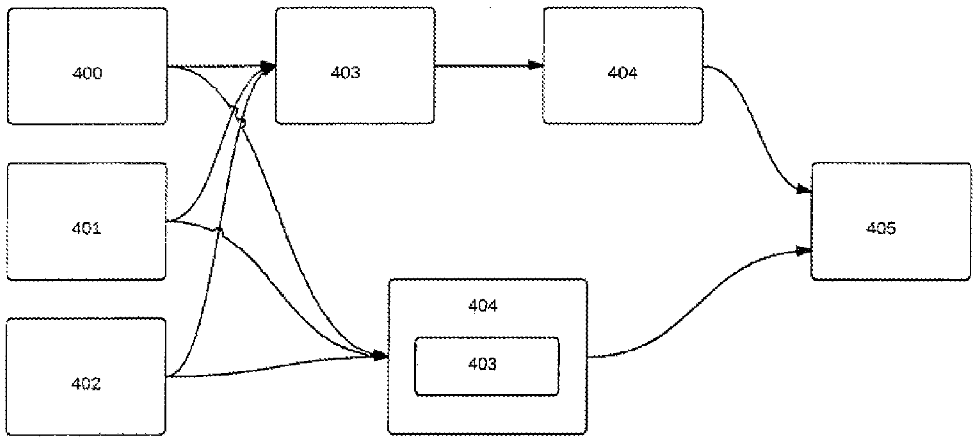
FIG. 3 illustrates a flow chart of an illustrative variation in which driver intent is used as a factor in noise cancellation.

In a number of illustrative variations, and as illustrated by FIG. 3, driver intent, which may be estimated from a wide variety of data such as but not limited to driving environment, may be used as a factor in adaptive ANC. In such variations, the vehicle may include a user input device, such as but not limited to manual input devices 210 such as a dial, touchscreen or keypad or voice activated devices such as a speech recognition system that allows a user to deliberately input driver input 401 data, such as but not limited to driver mood or driving environment, or any combination of any potential factors for adaptive ANC, that the ANC system 404 will use as a factor within an algorithm that determines the degree to which the ANC system is used to cancel noise. In such illustrative variations, vehicle performance data 400 such as but not limited to vehicle exhaust gas recirculation rate, engine instantaneous torque, crankshaft revolutions per minute or exhaust valve state may be fed to the control system 403, which may be separate from or part of the ANC system 404, and used as a factor within the ANC algorithm. Additionally, in such illustrative variations, general data 402 such has but not limited to vehicle location or surrounding weather may be fed to the control system 403 and used as a factor within the ANC algorithm which affects the control system's 403 activation and control of the sound emitting device 405. In such illustrative variations, the control system 403 may be separate from or part of the ANC system 404.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising: providing a vehicle comprising an active noise cancelling system; obtaining data indicating a driver intent from a vehicle; estimating driver intent based at least upon the data; and using a controller to make an adjustment to the amount of noise cancelled by the active noise cancelling system based at least upon the estimated driver intent.

Variation 2 may include the method as set forth in Variation 1 wherein obtaining data indicating a driver intent from the vehicle comprises producing data by tracking the drivers use of vehicle parts, components, decorations or sundry.

Variation 3 may include the method as set forth in any of Variations 1-2 wherein obtaining data indicating a driver intent from the vehicle comprises obtaining data indicating the driving environment.

Variation 4 may include the method as set forth in any of Variations 1-3 wherein the adjustment to the amount of noise cancelled by the active noise cancelling system takes place over a period of time.

Variation 5 may include the method as set forth in any of Variations 1-4 wherein the adjustment to the amount of noise cancelled by the active noise cancelling system takes place continuously.

Variation 6 may include the method as set forth in Variation 4 wherein the adjustment to the amount of noise cancelled by the active noise cancelling system is an adaptive ramping off of the active noise cancelling system.

Variation 7 may include the method as set forth in any of Variations 1-6 wherein the vehicle further comprises a user input device which allows a user to make manual indications to the active noise cancelling system.

Variation 8 may include the method as set forth in Variation 6 wherein obtaining data indicating a driver intent from a vehicle comprises using a controller to determine whether a user has input data indicating a driver intent.

Variation 9 may include the method as set forth in any of Variations 1-8 wherein estimating driver intent based at least upon the data comprises analyzing the rate-of-change of a vehicle pedal position.

Variation 10 may include the method as set forth in any of Variations 1-9 wherein estimating driver intent based at least upon the data comprises analyzing the absolute position of a vehicle pedal.

Variation 11 may include the method as set forth in Variation 10 wherein the vehicle pedal is the accelerator pedal.

The above description of select variations within the scope of the invention is merely illustrative in nature and, thus, variations or variants thereof are not to be regarded as a departure from the spirit and scope of the invention.

What is claimed is:

1. A method comprising:
providing a vehicle comprising an active noise cancelling system;
obtaining data indicating a driver intent from a vehicle;
estimating driver intent based at least upon the data; and
using a controller to make an adjustment to the amount of noise cancelled by the active noise cancelling system based at least upon the estimated driver intent.

2. The method of claim 1 wherein obtaining data indicating a driver intent from the vehicle comprises producing data by tracking the drivers use of vehicle parts, components, decorations or sundry.

3. The method of claim 1 wherein obtaining data indicating a driver intent from the vehicle comprises obtaining data indicating the driving environment.

4. The method of claim 1 wherein the adjustment to the amount of noise cancelled by the active noise cancelling system takes place over a period of time.

5. The method of claim 1 wherein the adjustment to the amount of noise cancelled by the active noise cancelling system takes place continuously.

6. The method of claim 4 wherein the adjustment to the amount of noise cancelled by the active noise cancelling system is an adaptive ramping off of the active noise cancelling system.

7. The method of claim 1 wherein the vehicle further comprises a user input device which allows a user to make manual indications to the active noise cancelling system.

8. The method of claim 7 wherein obtaining data indicating a driver intent from a vehicle comprises using a controller to determine whether a user has input data indicating a driver intent.

9. The method of claim 1 wherein estimating driver intent based at least upon the data comprises analyzing the rate-of-change of a vehicle pedal position.

10. The method of claim 1 wherein estimating driver intent based at least upon the data comprises analyzing the absolute position of a vehicle pedal.

11. The method of claim 10 wherein the vehicle pedal is the accelerator pedal.

12. A method as set forth in claim 1 wherein the user input device comprises at least one of a dial, touchscreen, keypad or voice activated device.

13. A method as set forth in claim 7 wherein the input relates to at least one of vehicle location, surrounding weather or mood of the drive.

14. A method as set forth in claim 1 wherein the estimated drive intent comprises an intent of the driver to drive aggressively, as indicated by a rapid change in at least one of a vehicle accelerator pedal position, or a vehicle brake pedal position.

15. A method as set forth in claim 1 wherein the using a controller to make an adjustment to the amount of noise cancelled by the active noise cancelling system based at least upon the estimated driver intent comprises using a control system to detect the rate of change in orientation of the vehicle accelerator pedal and, based upon at least one of the rate of change of the vehicle accelerator pedal, adjusting the reactiveness an active noise cancellation system.

* * * * *